United States Patent [19]
Corbett

[11] Patent Number: 4,786,008
[45] Date of Patent: Nov. 22, 1988

[54] NUCLEAR POWERED DRONE

[75] Inventor: Marshall J. Corbett, E. Northport, N.Y.

[73] Assignee: Grumman Aerospace Corporation, Bethpage, N.Y.

[21] Appl. No.: 855,238

[22] Filed: Apr. 24, 1986

[51] Int. Cl.[4] ............................................. B64D 27/00
[52] U.S. Cl. ................................. 244/53 R; 244/57; 244/62
[58] Field of Search ................... 244/62, 53 R, 57, 60, 244/73 R, 117 A, 137 B; 60/644

[56] References Cited

U.S. PATENT DOCUMENTS

| | | |
|---|---|---|
| 1,749,572 | 3/1930 | Dorgan . |
| 2,170,958 | 8/1939 | Andrews . |
| 2,330,632 | 9/1943 | Seligman ............................... 244/57 |
| 2,370,035 | 2/1945 | Heymann ........................... 244/134 B |
| 2,563,054 | 8/1951 | Messinger ......................... 244/134 B |
| 2,604,277 | 7/1952 | Anxionnaz et al. . |
| 2,737,874 | 3/1956 | Gallay ............................... 214/134 B |
| 2,974,495 | 3/1961 | Pinnes et al. . |
| 3,102,852 | 9/1963 | Schenck, Jr. . |
| 3,235,205 | 2/1966 | Newcomb . |
| 3,258,911 | 7/1966 | Bouquet, Jr. et al . |
| 3,410,091 | 11/1968 | Frutschi ............................. 60/644.1 |
| 3,547,379 | 12/1970 | Kappus . |
| 3,547,380 | 12/1970 | Kappus . |
| 3,794,273 | 2/1974 | Girard . |
| 3,971,535 | 7/1976 | Jones . |
| 4,009,849 | 3/1977 | Eickmann . |
| 4,132,374 | 1/1979 | Abell . |

FOREIGN PATENT DOCUMENTS

| | | |
|---|---|---|
| 1947500 | 4/1971 | Fed. Rep. of Germany . |
| 314904 | 9/1969 | Sweden . |
| 526104 | 9/1940 | United Kingdom . |
| 754559 | 8/1956 | United Kingdom ................. 244/62 |

OTHER PUBLICATIONS

"Problems of the Nuclear Age", Hawker Siddeley Group, Dec. 1956, vol. 9, No. 4, pp. 97–103.
Aviation Week, Jul. 11, 1960, pp. 30–31.

Primary Examiner—Sherman D. Basinger
Assistant Examiner—Lynn M. Fiorito
Attorney, Agent, or Firm—Pollock, VandeSande & Priddy

[57] ABSTRACT

An unmanned aircraft is equipped with a helium-cooled Brayton cycle nuclear reactor. Heated helium gas drives turbines which in turn rotate propellers to maintain the aircraft aloft for a protracted period of time. After the helium gas expands in the turbines, it is passed through a closed loop including radiator tubes which radiate waste heat from the helium gas to space. The cooled helium gas is returned through the closed loop for repeat of the Brayton cycle.

3 Claims, 2 Drawing Sheets

NUCLEAR POWERED DRONE

FIELD OF THE INVENTION

The present invention is directed to drone aircraft, and more particularly to such an aircraft which is nuclear powered.

BACKGROUND OF THE INVENTION

In the event of a nuclear catastrophe, communications will become severely disrupted; and it is anticipated that government will have a great deal of difficulty in restoring order due to chaotic conditions. As a result, it will be critical to survey the extent of damage in all parts of the country in order to effectively begin recovery efforts.

In view of the anticipated heavy damage to roads and airfields, severe transportational difficulties are to be expected. Therefore, government's ability to inspect, at close range, geographic and human conditions either during or following nuclear attack will be severely curtailed.

Suggestions point to the obvious utilization of aircraft for reconnaissance purposes. However, in view of the fact that airfields would be largely destroyed, surveillance flights become impossible due to the need for frequent refueling.

BRIEF DESCRIPTION OF THE PRESENT INVENTION

The present invention offers a solution to this need by providing an effective nuclear powered unmanned aircraft that is capable of remaining in flight for extended periods of time, for example intervals exceeding six months—without the need for refueling. Such a nuclear powered unmanned aircraft (drone) may be preprogrammed to survey the landscape or may be manually directed to do so; and video images as well as instrumentation readings could be forwarded over an emergency communication link to a central government facility to assess damage. It is understood that nuclear powered aircraft are undesirable during peacetime in view of the substantial danger that such an aircraft poses when flying over civilian populations. However, such objections become academic after a nuclear attack has been experienced.

Unlike previously disclosed nuclear reactor aircraft designs, the present invention utilizes a sealed hot gas reactor loop for powering turbomachinery connected to propellers which power the drone. The utilization of propellers is advantageous since their efficient operation permits the aircraft to remain aloft for a protracted period of time without refueling. Unlike prior art nuclear aircraft which exhausts heated gas in order to remove waste heat from a reactor, the present invention incorporates radiators under the skin of the aircraft wings which radiate waste heat to space. The reactor utilized in the present invention is a gas-cooled helium reactor. As helium gas passes through the reactor, it is heated; and the heated gas travels through a closed loop to the turbomachinery which drives the aircraft propellers. The heated gas then travels to radiator tubes to radiate the remaining waste heat to space. The resulting cooled helium gas then undergoes compression and is returned to the reactor to complete a Brayton cycle.

The present invention avoids the use of liquid metal reactors because these metals are normally solid; and in order to use them as a circulating liquid, extremely high temperatures must be maintained which would present material design problems for the present aircraft which must be light and durable in order to sustain protracted flight.

The present design also accomplishes the discussed objective where other conventional types of reactors would fail. For example, the obvious choice of a water-cooled conventional reactor would be inappropriate for the present invention inasmuch as the relatively low heat transferability of water would require a huge radiator surface resulting in an impractically large wing area.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
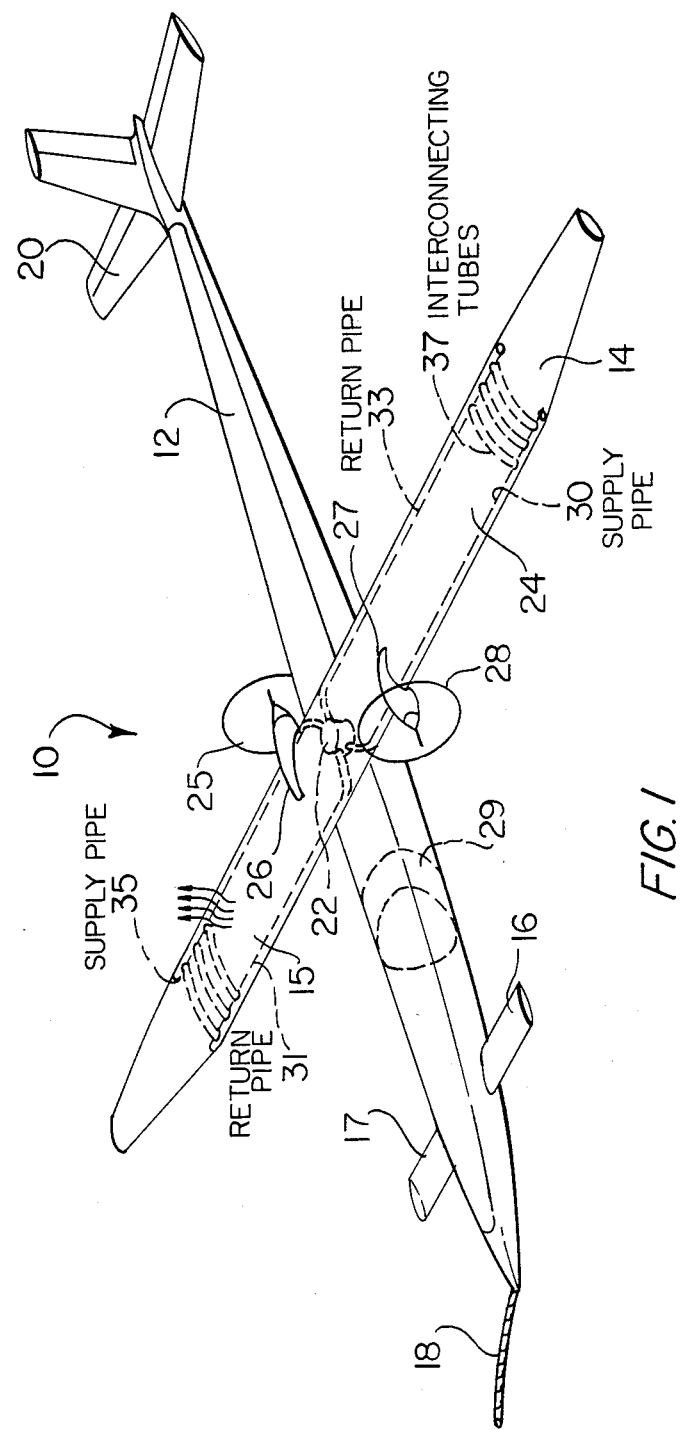
FIG. 1 is a diagrammatic illustration of a nuclear drone as presented by the present invention.

The nuclear powered drone of the present invention is generally indicated by reference numeral 10 in FIG. 1. The drone is seen to include a fuselage 12 and wings 14 and 15. At the middle section of the fuselage 12 are mounted fixed conventional canards 16 and 17. At the rear section of fuselage 12 is mounted a conventional empennage 20. A tow line 18 is connected to the nose of the fuselage which enables the drone to become airborne after being towed by a vehicle as is frequently done with gliders. Once airborne, the drone remains aloft under power, as will be explained hereinafter. The skin of the fuselage and wings may be fabricated from aluminum-lithium alloys or titanium. The same material should be used between these structural members in order to avoid differential expansion. A gas-cooled helium reactor 22 is centrally located within fuselage 12 and provides the power for the drone. The reactor is of the type disclosed in co-pending U.S. patent application Ser. No. 487,642, filed Apr. 22, 1983, and abandoned Dec. 23, 1985, and its structure is discussed in greater detail in connection with FIG. 2. This reactor is a Brayton cycle reactor and has been designed by Brookhaven National Laboratory.

When the reactor 22 is operating, hot helium gas flows through supply pipes 30 and 35 to respective turbines 27 and 26, for example of the type manufactured by Garrett Corporation. The heated helium gas undergoes expansion in the turbines thereby enabling the turbines to rotate corresponding propellers 28 and 25. The expanded gas then exits from the turbines and continues along a closed loop through return pipes 33 and 31 for return to reactor 22 after recompression of the gas by a conventional compressor which has not been shown in an effort to simplify the figure. After reheating in the reactor, a new Brayton cycle is initiated. The supply and return pipes are located within the wings 14 and 15. As is indicated in FIG. 1, capillary tubes 37 are also located within the wings and interconnect the parallel supply and return pipes 30, 33 and 35, 31. The capillary tubes are welded to the underside of the skin of wings 14 and 15 and may extend along the entire length thereof. The function of the capillary tubes is to act as a radiator and radiate Brayton cycle wasted heat upwardly through the skin 24 of the wings and into space. The pipes and capillary tubes are preferably fabricated from aluminum-lithium alloys or titanium to provide the necessary strength and weight reduction while retaining the same material as the skin of the fuselage and wings thereby avoiding differential expansion.

Although the loop for carrying the heated helium gas is intended to be completely sealed, it is inevitable that the light gas will diffuse slowly through seals. Accordingly, a helium storage reservoir 29 is included within the fuselage to replenish any lost helium gas on a continual basis.

Although the reactor 22 has been described as operating with helium gas, it can also operate with a helium-argon gas mixture to decrease helium permeability thereby decreasing the chance of gas leak through small fissures, cracks and seals.

In one application of the present invention, the wings 14 and 15 may be stowed at an angle on top of the fuselage 12 during the towed portion of flight of the lightly loaded drone. At about 40,000 feet, the wings may pivot outwardly to assume their fully extended positions.

The wings 14 and 15 are designed to produce a laminar flow airfoil. The propellers 25 and 28 are slow turning and are approximately 12 feet in diameter. The turbines 26 and 27 will generate 75 H.P. each in order to retain a typical drone airborne. Of course, during deployment of drone 10, the fuselage will be outfitted with appropriate guidance and communication equipment which does not form a part of the present invention per se. As the heated helium traverses the wing length and reaches the wing tip, it is anticipated that the gas will be cooled by losing approximately 650° F.

Figure 2:
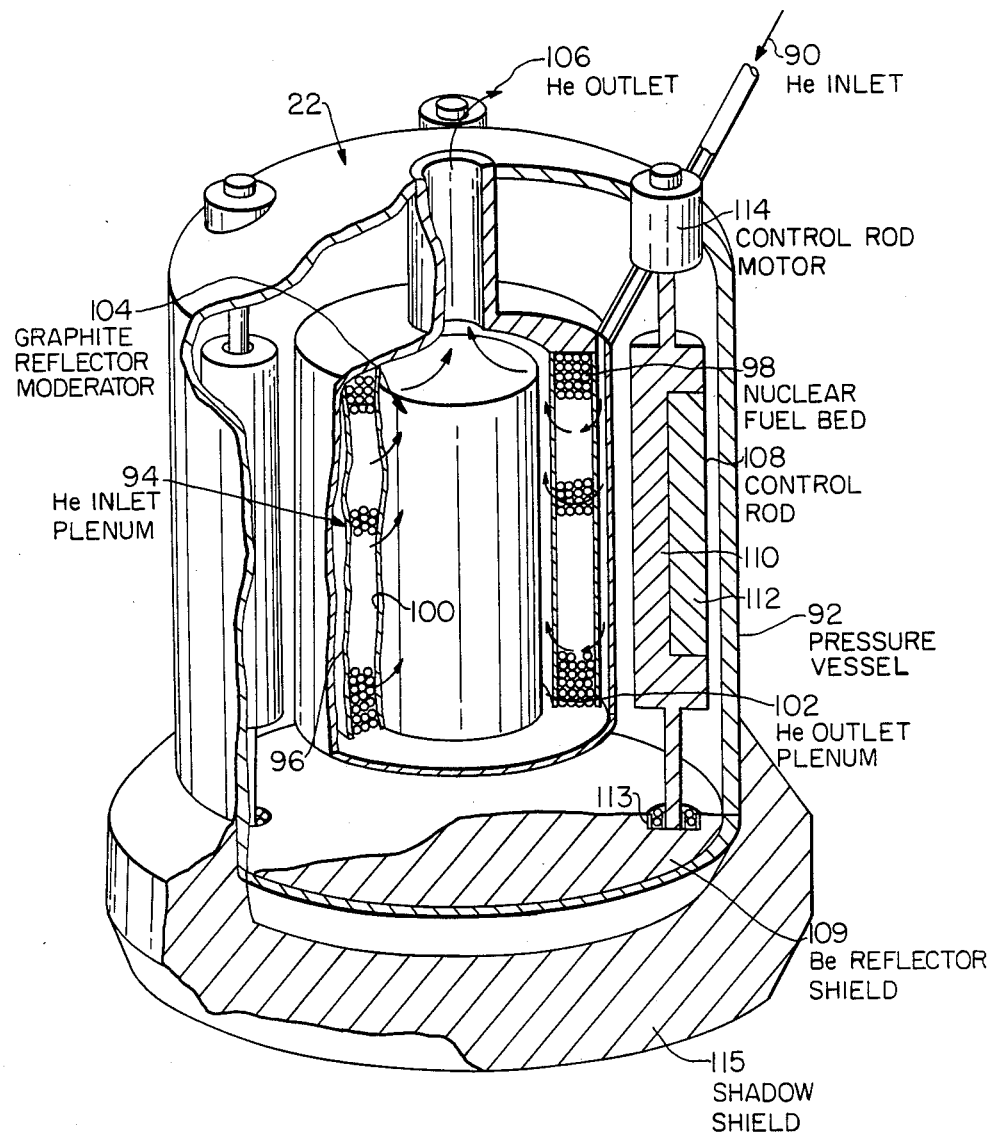
FIG. 2 is a partial cross-sectional view of a prior art helium-cooled nuclear reactor.

A detailed drawing of the reactor 22 is shown in FIG. 2. As previously mentioned, the illustrated helium gas-cooled, Brayton cycle reactor has been developed by the Brookhaven National Laboratory and is thermally rated at 50 megawatts.

Heated helium gas is transported to inlet 90 of a pressure vessel 92. The gas then travels within an inlet plenum 94 and is then transported through a porous Inconel sleeve 96, the material being available from the International Nickel Company. Radially inwardly of sleeve 96 is a nuclear fuel bed 98 comprising uranium particles. More particularly, $U_{235}$ particles permit passage of the gas through the nuclear fuel bed wherein the temperature of the helium gas is further elevated. The fuel bed material may take the form of particles known as Triso, manufactured by the General Atomic Corporation. A radially inward porous sleeve 100 is the inward boundary of the nuclear fuel bed and is preferably made from Zirconia ($ZrO_2$). After passing through the porous Zirconia, the further heated helium gas enters an outlet plenum 102 which is defined between the Zirconia sleeve 100 and a cylindrical graphite reflector-moderator 104 which is axially located within the reactor. The helium gas then exits from outlet 106 at which point the helium is at the highest temperature during the Brayton cycle. In order to control the temperature of the exiting helium, a plurality of control rods 108, typically four in number, are located in parallel, symmetrical spaced relation with the symmetry axis of the reactor. The control rod is primarily fashioned from a cylindrically shaped body of berylium (Be) 110 which acts as a neutron reflector. Embedded within the Be cylinder 110 is an insert 112 of $BeC_4$ which serves as a neutron absorber. A control rod motor 114 is associated with each of the control rods 108 to turn the control rod so as to effect greater neutron absorption or reflection as required for a particular desired helium temperature. Bearings 113 are located at the lower illustrated end of control rod 108 to facilitate the turning of the rod. A lower end portion of the reactor is encased within a Be reflector shield 109. This material is also preferably located between the control rods 108 and the radially outward boundary of inlet plenum 94, which has been left out of FIG. 2 to prevent obfuscation of the figure. A radiation shadow shield 115, fabricated from lead, may be attached to one end of the reactor to prevent radiation from this end.

As described, the present invention is seen to offer a solution for a reconnaissance aircraft in a nuclear environment which is capable of remaining aloft for several months without refueling.

It should be understood that the invention is not limited to the exact details of construction shown and described herein, for obvious modifications will occur to persons skilled in the art.

I claim:
1. An aircraft for extended flights comprising:
   a nuclear reactor cooled by a gas which includes a helium component;
   at leat one turbine which receives expanding heated gas from the reactor;
   a propeller driven by the turbine;
   heat-radiating tubes located within wings of the aircraft and connected in a closed loop with the turbine for radiating waste heat from the gas to space;
   the tubes extending along substantially the entire length of the aircraft wings and directly attached to an inner surface of the upper portions of the wings, covering almost the entire inner surface thereof, to facilitate heat radiation to space without intermediary radiating fins.
2. The structure set forth in claim 1 wherein the reactor is cooled by helium gas.
3. The structure set forth in claim 1 wherein the reactor is cooled by a gas mixture including helium and argon.

* * * * *

UNITED STATES PATENT AND TRADEMARK OFFICE
CERTIFICATE OF CORRECTION

PATENT NO. : 4,786,008
DATED : November 22, 1988
INVENTOR(S) : Marshall J. Corbett It is certified that error appears in the above-identified patent and that said Letters Patent is hereby corrected as shown below:

Column 4, line 39, change "leat" to --least--.

Signed and Sealed this

Second Day of May, 1989

Attest:

DONALD J. QUIGG

*Attesting Officer*   *Commissioner of Patents and Trademarks*